United States Patent [19]
Karstens et al.

[11] Patent Number: 5,939,544
[45] Date of Patent: Aug. 17, 1999

[54] PROCESS FOR ACTIVATING POLYSACCHARIDES, POLYSACCHARIDES PRODUCED BY THIS PROCESS, AND USE THEREOF

[75] Inventors: Ties Karstens, Botzingen; Hans Steinmeier, Baden-Würtemberg, both of Germany

[73] Assignee: Rhodia Acetow AG, Freiburg, Germany

[21] Appl. No.: 08/913,782

[22] PCT Filed: Mar. 22, 1996

[86] PCT No.: PCT/EP96/01274

§ 371 Date: Nov. 6, 1997

§ 102(e) Date: Nov. 6, 1997

[87] PCT Pub. No.: WO96/30411

PCT Pub. Date: Oct. 3, 1996

[30] Foreign Application Priority Data

Mar. 25, 1996 [DE] Germany ............ 195 11 061

[51] Int. Cl.$^6$ .................. C08B 1/00; C08B 1/02; C08B 1/06
[52] U.S. Cl. .................. 536/124; 536/56
[58] Field of Search .................. 536/56, 124

[56] References Cited

U.S. PATENT DOCUMENTS

| | | |
|---|---|---|
| 4,600,590 | 7/1986 | Dale .................. 426/69 |
| 5,037,663 | 8/1991 | Dale .................. 426/69 |
| 5,473,061 | 12/1995 | Bredereck et al. .................. 536/59 |

FOREIGN PATENT DOCUMENTS

| | | |
|---|---|---|
| 98322 | 6/1973 | German Dem. Rep. . |
| 3241720 | 5/1984 | Germany . |
| 914563 | 3/1982 | U.S.S.R. . |

OTHER PUBLICATIONS

Peng et al. *Hsin Hsien Wei*, vol. 22(9): 13–14, (1980). **

*Primary Examiner*—Howard C. Lee
*Attorney, Agent, or Firm*—Bucknam and Archer

[57] ABSTRACT

The process for activating polysaccharides consists of contacting the polysaccharide with liquid ammonia at an initial pressure which is higher than atmospheric pressure and at a temperature of at least approximately 25° C., the amount of liquid ammonia being sufficient at least for wetting the surface of the polysaccharide starting material which is then expanded. The volume available for the polysaccharide/liquid ammonia system is enlarged in the manner of an explosion by lowering the pressure by at least 5 bar. The process is particularly suitable for activating cellulose, guar gum, starch and chitin. The process enables cellulose to be modified in a novel manner. The activated polysaccharides display higher reactivity and improved elimination of reagents during acylation, alkylation, silylation, xanthogenation and carbomoylation with largely homogeneous reaction processes.

30 Claims, 3 Drawing Sheets

PROCESS FOR ACTIVATING POLYSACCHARIDES, POLYSACCHARIDES PRODUCED BY THIS PROCESS, AND USE THEREOF

FIELD OF THE INVENTION

The invention relates to a process for activating polysaccharides, with which the polysaccharide starting material is brought in contact with liquid ammonia at a starting pressure higher than atmospheric pressure and at a temperature of at least about 25° C., wherein the quantity of liquid ammonia suffices to at least wet the surface of the polysaccharide starting material, and the mixture is subsequently subjected to a pressure release, as well as to activated polysaccharides made by this process.

Cellulose is a linear polysaccharide built up from glucose monomer units. The smallest macroscopic structural elements of native cellulose are elementary crystallites, which consist of parallel aggregated cellulose molecules. Because of the macromolecular nature of the molecules, many of these elementary crystallites are linked by random molecule segments into long strands, the elementary fibrils. These elementary fibrils can join up along a variable length into secondary aggregations. The length of the secondary aggregations and the aggregation degree are important structural characteristics.

BACKGROUND OF THE PRIOR ART

Prior to certain further processing steps, e.g. prior to the etherification, cellulose must be activated. Depending on the processing conditions it may happen that no homogeneous activation of the cellulose takes place, because the crystalline regions are poorly accessible to the activating agents that are used. It is known to activate cellulose by swelling it with liquid ammonia (see H. A. Krässig, Cellulose Structure, Accessibility and Reactivity, Gordon and Breach Science Publishers, 1992). The ammonia molecule, because of its free electron pair on the nitrogen atom, can compete with hydroxyl groups of adjoining molecule chains and substitute OH—O—hydrogen bridges by OH—N bonds. This leads to an incorporation of ammonia in the crystal lattice and causes an expanding of the crystal lattice. Ammonia-cellulose complexes are formed. The formed ammonia-cellulose complexes are relatively unstable. When evaporating the ammonia, the triple growth in fibre diameter returns to its original dimensions. The complex is also destroyed when the ammonia is washed out with water or alcohol. Also here the original cellulose crystal structure is regularly regained.

During the subsequent derivation reactions a residual ammonia content is generally disturbing. During the acylation, for example, an undesirable ammonium salt occurs. This adversely affects the efficacy of the catalysts used in the process.

The DE 43 29 937 proposes that, in order to maintain the activation state after the ammonia swelling, under the effect of superheated steam the required residual ammonia should be replaced by water as swelling or inclusion agent. It has been found that the activation state is lost quickly when the material treated in this manner is not immediately processed further. According to the DE 0 108 991 the cellulose, after the swelling in liquid ammonia at a low temperature, is not recovered in the dry form but the mixture is mixed with an aqueous alkali hydroxide solution and the ammonia is removed in the presence of the alkalising agent. The obtained alkaline cellulose suspension is immediately subjected to an etherification reaction.

It is, therefore, among others an object of the process according to the invention described hereinbelow to make available a process in which the residual ammonia can be removed without problem while to a large extent maintaining the activation, without additional inclusion agents, e.g. water being required.

The U.S. Pat. No. 5,322,524 describes cellulose fibres or cellulose-containing fibres with an improved resistance to abrasion and an increased permeability with respect to chemicals. The increased permeability leads to an improved activity in respect of chemicals. According to the known proposal, cellulose fibres are treated in ammonia vapour, between room temperature and 140° C. at about 7 bar (100 psi) to 120 bar (1,700 psi), for a sufficiently long time to change the inter-atomic planar distances in the cellulose and to obtain another modification of the cellulose in the form of stable crystalline cellulose III. The operation is carried out, for example, in a Parr cylinder and the pressure is reduced by opening same. Only ammonia escapes. Cellulose fibres remain behind in the Parr cylinder. The obtained fibres of crystalline cellulose III can be treated in ethylene diamine and can subsequently be subjected to boiling in dimethyl formamide to convert the cellulose III to cellulose IV. The stability of the cellulose III is proved by the fact that after one hour of boiling in water it cannot be converted to cellulose I. It is characterised by a specific X-ray diffraction spectrum with peaks at diffraction angles 2θ of 11.5, 15.5 and 20.5. The state of the art described in the foregoing corresponds to a large extent to that indicated in the publication "Textile Research Journal", July 1986, p. 419–424.

Also the publication "The Journal of Physical Chemistry", Vol. 41, No. 6, p. 777 to 786 only describes the treatment of individual fibres in liquid ammonia at −75° C. Here a swelling of the fibres takes place due to the action of the liquid ammonia. After removing the fibres the ammonia is immediately evaporated unless a thin protective layer of low-boiling paraffin oil is used. The X-ray diffraction spectrum of the obtained fibres does not display a complete mutuality with the spectrum which characterises the cellulose activated according to the invention described hereinbelow.

The EP-A-0 077 287 relates to the use of liquid ammonia for activating cellulose contained in animal feeds, using high pressure. According to this the material that contains the cellulose is treated with liquid ammonia at high pressure. Then a quick reduction of the pressure to atmospheric pressure takes place, which causes boiling of the ammonia and a separation into fibres of the cellulose material. The cellulose starting material remains in the system, the internal pressure of which is reduced to atmospheric pressure.

The U.S. Pat. No. 3,707,436 proposes a process for producing cellulose for the paper manufacture, with which the lignocellulose material is impregnated with anhydrous ammonia in a closed chamber under pressure and the pressure is suddenly reduced, during which an explosion-like removal of the ammonia and a flinging out of the material takes place. The starting material preferably consists of wood chips which, in addition to cellulose, contain considerable quantities of lignin, hemicellulose and up to 100% water content. The wood chips are impregnated with so much ammonia that the system contains at least the same quantity of ammonia as water, and are heated to a temperature which suffices for their plastification. In the examples a mass ratio of ammonia to water in the range of 2 to 4 is used. The hemicelluloses remain behind in the product in the water-insoluble form. They make the material plastic and give strength to the paper products made from same. The obtained cellulose is slightly more amorphous and plastic than in the initial state.

The U.S. Pat. No. 5,171,592 describes a process for treating biomasses. The process comprises a.o. the "Ammonia Freeze Explosion" (AFEX), with which the biomass is swollen with liquid ammonia and is then exploded into a flash tank by opening a valve. During the explosion about 25% of the used ammonia are evaporated. Preferably, the biomass is predried by treating it with superheated ammonia vapour, deaerated and pre-heated. After the AFEX treatment the remaining liquid ammonia is expelled by a treatment with ammonia vapour.

In wood and other biomasses cellulose is present accompanied by lignin and hemicelluloses. Biomass furthermore usually contains at least 50% moisture. Lignin is a complex high-polymer natural substance which is embedded in the inter-fibrillary capillary spaces of the cellulose fibres. The fibrillary cellulose chains are joined by a thin cross-linked layer of lignin and hemicellulose to other fibrils to form a fibre bundle. The matrix of lignin and hemicellulose surrounds and protects the cellulose fibrils and holds the structure together, similar to a resin in a composite glassfibre material. From what has been mentioned it will be clear that during the treatment with liquid ammonia the cellulose in this rigid bond—except in the amorphous bonding regions—is hardly accessible to a swelling. The processes based on lignocellulose material are aimed more at forming a fibrous material from separate, but undamaged lignocellulose fibre cores. An activation of the cellulose contained in same hardly takes place. When the treated material is subsequently subjected to a separation of lignin and/or hemicellulose, during the extraction steps that are used this slight activation of the cellulose will anyway be lost. Processes which relate to the activation of lignocellulose material in the form of wood or another biomass do not, therefore, display any significant correspondence with the subject of the present invention.

SUMMARY OF THE INVENTION

It is the object of the invention to provide a process of the type described at the outset, the process product of which displays, during the normal derivation processes, an improved activity compared to that of the comparison products of the state of the art, e.g. during the acylation, alkylation, silylation, xanthogenation and carbamoylation. It must be possible to reduce the residual ammonia content to less than 0.2% by mass whilst maintaining the activity.

In addition, there exists a need for a process by which also polysaccharides other than cellulose can be subjected to an activation.

According to the invention this object is achieved by a process which is characterised in that the volume available for the polysaccharide/liquid ammonia system is increased in an explosion-like manner whilst reducing the pressure by at least 5 bar.

The term "explosion-like" used here must be understood in the narrow sense. Preferably, the explosion-like increase in volume takes place within less than one second, in particular less than 0.5 seconds. In the case of a continuous process, the process is adapted to an incremental polysaccharide/liquid ammonia quantity. The polysaccharide starting material and the liquid ammonia are preferably brought in contact in a pressure device, and the pressure of the polysaccharide/liquid ammonia system is released by transferring the system into an explosion chamber with a volume larger than that of the pressure device. Preferably, the starting pressure lies between about 5 and 46 bar and in particular between about 25 and 30 bar. The minimum drop in pressure of 5 bar is critical. Below this value the object of the invention will not be achieved, i.e. the product will not have the desired properties. An excess of the upper limit value of about 46 bar does not produce any further advantages. The use of this pressure requires a relatively high expenditure on equipment, so that a further increase in pressure is not expedient when taking practical considerations into account. The temperature of about 25 to 85° C. and 55 to 65° C., respectively, correlates with the indicated pressure frame. Preferably, the starting pressure in the polysaccharide/liquid ammonia system is reduced explosion-like by at least about 10 bar and, in particular, by about 30 bar. The explosion preferably takes place in an explosion chamber which is kept under vacuum. The explosion chamber must be chosen sufficiently large to obtain the desired separation into fibres or the defibrillation in the larger volume.

An adequate quantity of ammonia must be pressed into the pressure device so that liquid ammonia is present under the pressure and temperature conditions required according to the invention and at least the surface of the polysaccharide starting material is wetted. Preferably, for 1 part by mass of polysaccharide at least 1 part by mass of liquid ammonia, in particular at least about 5 parts by mass and especially about 5 to 10 parts by mass of liquid ammonia, are present. Due to the action of the ammonia an at least partial swelling of the polysaccharide starting material takes place.

A multitude of polysaccharides can be activated by the process according to the invention. Preferably, they are polysaccharides which, because of the formation of intermolecular hydrogen bridge bonds, have crystalline regions. As a rule such polysaccharides are not or hardly soluble in cold water. The polysaccharides may be modified by derivation, cross-linking or conversion. Preferably, the used polysaccharides have a polyhexose structure, i.e. a structure the monomers of which are $C_6$-saccharides. These include the biopolymers starch, cellulose, inulin, chitin and alginic acid, of which cellulose, chitin and starch are preferred. The mentioned polysaccharides each contain only one type of building blocks—even though possibly in changing glycosidic combination—and can, therefore, be counted among the homoglycans. Other polysaccharides that can be activated according to the invention are heteroglycans of various types of monomer units. The preferred heteroglycans include the galactomannans, of which guar gum is particularly preferred.

The polysaccharides that are used preferably have a polymerisation degree DP (average number of monomer units bound in the macromolecule) of 500 to 10,000, in particular of 500 to 3,000, but under no circumstances less than 150.

A particularly suitable cellulose starting material for carrying out the process according to the invention are chemical pulps in rolls or balls, with a density of about 0.6 to 0.8 g/cm³.

The polysaccharides used according to the invention preferably are chemically pure. They preferably contain less than 18% by mass, in particular less than 90% by mass foreign substances, such as, in particular, proteins and lignin. In particularly preferred embodiments the polysaccharides contain less than 5% by mass, in particular less than 1% by mass foreign substances. As a rule the used polysaccharides must be free from protein. Too high protein content causes undesirable secondary reactions during the further processing.

The degree of activation obtainable according to the invention depends on the water content of the polysaccharide starting material. Too high a water content causes an insufficient activation, which can probably be attributed to the diluting effect of the water molecules on the ammonia. The water content of the polysaccharide starting material therefore, preferably is less than 12% by mass, in particular less than 9% by mass. In particularly preferred embodiments the water content is less than 0.5% by mass. As most polysaccharides are hygroscopic and during the storage under ambient conditions absorb water, to maintain a low water or moisture content it may be necessary to subject the polysaccharide starting material to suitable drying steps. The equilibrium water content of most polysaccharides under normal conditions is about 7 to 9% by mass.

The process according to the invention will now be explained in greater detail. At the beginning of the process the polysaccharide starting material and a quantity n of ammonia are present at a pressure $p_1$ and temperature $T_1$ ($\geq$ about 25° C.) in a volume $V_1$. Under these conditions the fraction $\alpha.n$ is present in the liquid form. By additional inert gas pressure, $\alpha$ can be brought to values close to 1 and $p_1$ can be increased. This system is subjected to a change of state by increasing the volume to $V_2$, during which the new temperature $T_2$ and new pressure $p_2$ will occur and $(p_1-p_2) \geq 5$ bar. This change is basically adiabatic but it is also possible at the same time, to supply energy to the system by, for example, heating the explosion chamber. Under the new conditions $V_2$, $p_2$, $T_2$ preferably more than about 50%, in particular more than 80% of the original liquid ammonia quantity $\alpha.n$ is present in the gaseous form. Most preferred is a practically complete, sudden evaporation of the liquid ammonia. Since the adiabatic change in state goes hand in hand with a drop in temperature, $T_1$ must be chosen sufficiently high and/or $p_2$ sufficiently low to meet this condition. To ensure at a given volume difference $(V_2-V_1)$ the greatest possible drop in pressure, in the case of the batch-wise mode of operation the explosion chamber is kept under vacuum before the polysaccharide/liquid ammonia system is fed in. With the continuous mode of operation, gaseous ammonia is preferably drawn off continuously from the explosion chamber to maintain a sufficiently low pressure.

The process according to the invention, with which more than 50% of the used quantity of liquid ammonia is suddenly evaporated by an increase in volume/reduction in pressure, differs from the "ammonia explosion" process of the state of the art. With the known processes a drop in pressure is generally produced by opening a valve of an autoclave. As a result thereof a small quantity of the used ammonia, for example 20%, evaporates quickly, and the mass treated with liquid ammonia remains behind in the autoclave together with the rest of the ammonia. Due to the occurring cooling effect the mass ruptures. The residual quantity of liquid ammonia boils continuously, the evaporation of the ammonia takes place over a long time. With the known processes the residual ammonia content of the primary process product is quite high, generally well above 1% by mass.

The process according to the invention can be carried out batch-wise or continuously. With the batch-wise mode of operation the apparatus essentially comprises a pressure tank which can be filled with the material to be treated, and a collecting or expansion tank connected to same by way of a valve. Special attention must be paid to the fact that the valve, when open, must have a large opening so that during the explosion the polysaccharide starting material will not dam up and not only ammonia will escape. The volume of the expansion tank is many times greater than that of the pressure tank, e.g. the volume of the pressure tank is 1 l and the volume of the expansion tank 30 l. The pressure tank is connected to a feed pipe for ammonia, possibly via a pressure-increasing device. To ensure a further increase in pressure, in addition a supply pipe for inert gases, e.g. nitrogen, can be provided.

With the continuous mode of operation the process can be carried out in a tubular or cylindrical, pressure-resistant reactor, with which the bringing into contact of polysaccharide and liquid ammonia takes place in the cylinder of the reactor and the impregnated material is moved through the reactor in the form of a wad with the aid of a conveyor worm and is intermittently discharged into a collecting chamber through a valve or a suitable system of pressure locks. Suitable components, which the expert can readily adapt for implementing the process according to the invention, are described in the EP-A-329 173 and U.S. Pat. No. 4,211,163, respectively.

The contact time between the liquid ammonia and starting material inside the pressure vessel is not critical. It may be very short, e.g. a few seconds. As an expedient time frame about 1 s to 60 min can be indicated, but for polysaccharides that are difficult to swell it may also be much longer. A contact time of less than 1 s can hardly be realised for practical reasons. A treatment of more than 60 minutes generally does not produce any further technical advantage. Contact times in the range from 10 s to 1 minute are generally preferred.

After transferring the polysaccharide/liquid ammonia system into the explosion chamber, the gaseous ammonia is drawn off, preferably liquefied to liquid ammonia and then fed back into the process.

After the increase in volume/reduction in pressure the polysaccharide is preferably subjected to a heat treatment and/or vacuum treatment to reduce the residual contents of water and ammonia. Optimal results are obtained, for example, at a temperature of 60° C. and a pressure of 10 mbar over 2 h. In this way the residual water content can be reduced to less than 1% by mass and the residual ammonia content to less than 0.2% by mass.

With the process according to the invention probably the following reactions take place: Due to the action of the liquid ammonia at least partial swelling of the polysaccharide starting material takes place. Inter-molecular hydrogen bridge bonds are dissolved as the ammonia molecule competes with hydroxyl groups of adjoining molecules. As a result of the explosion-like increase in volume/reduction in pressure an evaporation of the ammonia present between the molecule chains takes place. The molecule chains, the inter-molecular hydrogen bridge bonds of which have beforehand been dissolved, are torn apart. At the same time, in other places a new formation of hydrogen bridge bonds may take place, the linking density of these being, however, lower than in the starting polysaccharide. In this manner the newly assumed spatial structure is fixed. The residual ammonia content can be reduced without problem to less than 0.1% without using other inclusion agents and without the activation getting lost, since the hydroxyl groups of originally adjoining molecules chains are now spatially so far removed from one another that they can no longer assume the original hydrogen bridge bonds.

A particularly important application of the process according to the invention is the activation of cellulose. As already discussed at the outset, cellulose has a spatial network structure in which the elementary fibrils are associated over a specific length into fibrillary aggregates. The aggregation degree and the aggregation length are important structural characteristics. The simplest method for determining the length of these elements in cellulose fibres consists of examining the course of the heterogeneous hydrolytic decomposition. Because of the dense packing of the cellulose molecules in the elementary crystallites or molten aggregates of the elementary fibrils, the heterogeneous hydrolytic attack by acids is limited more or less to the surface molecules of the elementary fibrils or their aggregations and to the random segments of the cellulose macromolecules which connect the crystallites into fibrillary strands. For this reason the initially fast molecular decomposition comes practically to a standstill when the DP-length of the crystallites is reached. That is why one speaks of the "Limiting Degree of Polymerisation" or "Leveling-off Degree of Polymerisation" (LOPD-value). In this connection we refer to Hans A. Krässig "Polymer Monographs", Vol. 11, Gordon and Breach Science Publishers, in particular p. 191 and following.

An activated cellulose obtained according to the invention occurs in the form of fluff. This is characterised in that it has a favourable LODP-value for the various derivation measures. This value preferably lies between about 50 and 200, in particular between about 100 and 160 and especially preferred between about 120 and 145. The mentioned framework of LOPD-values, which are associated with preferred embodiments of the invention, is an indication of the improved accessibility of the fluff according to the invention for, for example, derivation reagents.

The cellulose fluff according to the invention is furthermore characterised by a not as yet attained low density of less than about 0.2 g/cm$^3$. In this a reason can be seen for its special activity during the indicated derivation processes. This advantage is increased when the density of the fluff is less than 0.1 g/cm$^3$. It is a special dimensional figure and furnishes information about the extent of the explosion treatment.

The particularly high activity during the various derivation processes can above all be attributed to the fact that the fluff or the fibres forming same are more accessible to the chemicals that are used. This leads to shorter reaction times and to a low consumption of chemicals. Furthermore, more homogeneous derivation products are obtained.

Of the derivation reactions, special mention must be made of the acylation, e.g. acetylation, silylation, xanthogenation or production of carbamates and alkylation by etherification with alkyl halogenides, epoxy compounds, unsaturated organic compound (Michael addition) and the like. This list of derivation processes is not limiting. The mentioned advantage of improved accessibility can also be utilised for any other derivation processes. This also applies to the dissolving of the fluff according to the invention in suitable chemicals, e.g. in morpholine-N-oxide. This is a known solvent for cellulose to, for example, spin it out of solution. It was found, for example, during the acetylation that at the end of the reaction the reaction solution is more transparent and completely free from fibres and gel when compared with that made from "non exploded" material. For reactions such as the xanthogenation, which take place under swelling and formation of alkali cellulose in an alkaline medium, it was found that lower NaOH concentrations (5–6% instead of at least 10–12%, normally more than 20% NaOH) suffice to change the lattice into cellulose II. In general the reaction pattern of heterogeneous reactions in an alkaline medium with cellulose activated according to the invention comes close to a homogeneous reaction. For the xanthogenation the quantity of used carbon bisulphide can be clearly reduced without disadvantages.

A cellulose activated according to the invention is characterised in that it has an X-ray diffraction spectrum with peaks of the indicated relative intensities at the following diffraction angles 2θ and with the relative intensities:
Peak 11.25±1 with the relative intensity of about 15 to 25;
Peak 17±1 with the relative intensity of about 25 to 40;
Peak 20.5±1 with the relative intensity of 100 (reference value)

This X-ray spectrum differs clearly from the X-ray spectrums of the known cellulose modifications I, II, III and IV. By the process according to the invention a new cellulose modification can, therefore, be obtained.

A special characteristic of the cellulose fluff according to the invention consists of the demarcation from the state of the art described at the outset because, during the boiling in water under atmospheric pressure for at least one hour it is again to a large extent converted back to cellulose I. This is in strict contradiction to the information of the U.S. Pat. No. 5,322,524 about the material described there.

For the various fields of application it has as a rule proved advantageous when the ammonia content of the cellulose fluff according to the invention is less than about 0.5% by mass.

The cellulose fluff according to the invention is furthermore characterised in that it can be produced with a desirable low water content of less than about 6% by mass, in particular less than 1% by mass. Accordingly, during the practical implementation of the teachings of the invention the water content can without problem be reduced to below the value of commercial cellulose materials. These normally contain about 6 to 7% water. If the consumer is offered a material with a water content of, in particular, less than 1% by mass, this means a reduction in the transport costs and a considerable reduction in the consumption of chemicals during, for example, the acylation.

Another application of the process according to the invention is the activation of guar gum. Guar gum activated according to the invention and compounds obtained from same by derivation, when used as thickening agents, stand out by, for example, advantageous rheological properties. Aqueous solutions thereof, in contrast to untreated forms, display a viscosity which is largely independent of a shearing effect. Guar gum derivatives which are activated according to the invention prior to the derivation moreover display a favourable redispersability after the drying, which is advantageous when printing textiles using thickened dye pastes.

A further application of the process according to the invention is the activation of chitin. Chitin normally occurs in smooth hard particles which are very difficult to dissolve in solvents. By the treatment according to the invention a morphological change takes place, during which the surface is roughened and the particles are expanded. The accessibility to chemicals and/or solvents is decisively improved. From chitin activated according to the invention, by a partial de-acetylation to chitosan, interesting and until now difficult to obtain products can be produced for use in the cosmetics, medicine, food-technology and chemical-technical fields.

With the process according to the invention, by the complete "explosion" of a polysaccharide/liquid ammonia system which has at least been wetted with liquid ammonia, in possibly about one second in an explosion chamber, a product can be obtained which stands out by particularly advantageous properties. It has an unusually low density. This assists among others the derivation reactions, e.g. within the framework of the alkylation, acylation, silylation and xanthogenation, seeing that the polysaccharides activated according to the invention are better accessible to derivation agents. This reduces the reaction time and the consumption of chemicals. A reason for the improved reactivity may also lie in the special chemical-structural properties of the products according to the invention.

In contrast to the state of the art, where no explosion is carried out, relatively high residual ammonia contents to maintain the activation are no longer required. The explosion effect probably has a positive influence on the activation of the material in question. It is no longer necessary to substitute ammonia by a swelling or inclusion agent. This means a simplification of the process. The explosion-like pressure release of the system, e.g. (cellulose or cellulose-containing material)/liquid ammonia, from the pressure vessel, results in a fluff-like defibrillation of the material which originally was present in, for example, the form of pieces cut from a sheet. The defibrillation not only results in a reduction of the density, but also in a particularly great specific surface. This results in a morphologically changed state of the cellulose material. This is proved, among others, by the mentioned special X-ray diffraction spectrum. The extent of the separation into fibres (defibrillation) can without problem be positively influenced by a higher temperature of the starting material. As a result thereof the residual ammonia content can without problem be adjusted to less than 0.1% at a desirable activation. The exchange of residual ammonia does not require additional inclusion agents, such as water.

The invention will still be explained in greater detail with reference to examples, in which connection first of all the determination methods that are used are described.

I. DETERMINATION METHODS

Determination of Level-off DP of cellulose: 590 ml denatured ethyl alcohol are mixed with 30 ml concentration sulphuric acid and heated for 30 minutes under reflux on the water bath. After cooling, for control purposes the sulphuric acid content is determined, which must be about 5.8%. 500 mg of the to be tested cellulose sample with 30 ml of the ethanolic sulphuric acid are heated for 7 hours to boiling point (82° C.) on the water bath in a 100 ml round flask provided with a reflux cooler. Then the cellulose is separated from the ethanolic sulphuric acid on a frit, washed first with water and then with ethanol, and the DP of the dried, hydrolytically decomposed cellulose is determined.

The DP-value was determined by the Cuoxam method.

Acetylation test: With this test the temperature pattern during the acetylation of cellulose samples is examined. The following method was used: 200 g of the to be tested cellulose are mixed in a 2 l flask with 800 ml acetic acid and 1.0 ml sulphuric acid which beforehand were heated to 70° C., and kept on a heated roller bank at 45 to 50° C. After about 1.5 h the melting point of the acetic acid is determined, and from this the quantity of acetic acid anhydride required for the drying is calculated. After a further 30 minutes at 45 to 50° C., the calculated quantity of anhydride is added and the mixture is cooled to 20 to 22° C. Then the mixture is mixed with 500 ml acetic acid anhydride in a Dewar vessel whilst stirring continuously. From the moment when the anhydride is added, the change in temperature is recorded by a X–Y recorder in dependence on the time. The determination is ended when the temperature starts to drop.

II. EXAMPLES

Example 1

This example explains the activation of cellulose according to the invention in a batch-wise process.

800 g of commercial chemical cellulose with an alpha-cellulose content of about 96% in sheet form (water content about 8%) was cut into pieces of about 1.3×1.3 cm. Of these 20 g were put in an autoclave with a volume of 1 l and a double wall for steam heating. Then 200 g of liquid ammonia were pressed into the autoclave through a valve. By the additional steam heating of the autoclave the temperature was increased to 70° C. By doing so, a pressure of about 9 bar occurred inside the autoclave. The system was kept under these conditions for 60 seconds. Next, by opening the valve (diameter of the opening: 4 cm) it was suddenly and completely pressure relieved into an explosion tank with a volume of 30 l. The mass ratio ammonia/cellulose material was 10:1. An optimal defibrillation took place.

The ammonia content of the product occurring in the explosion chamber amounted to about 1% by weight related to the defibrillated cellulose material.

To isolate the product the gaseous ammonia was drawn off by applying a vacuum, which caused the ammonia content to drop to 0.2% by mass.

The DP and LODP values were as follows:

|  | DP | LODP |
| --- | --- | --- |
| Before the treatment with ammonia | 1,025 | 349 |
| After the treatment with ammonia | 975 | 148 |

Example 2

In this example the duration of the pressure drop during an ammonia explosion according to the invention was examined.

60 g of cellulose were put in a steel pressure cylinder and 200 g liquid ammonia were pressed in. By electric heating provided on the outside of the cylinder, the cellulose/ammonia system, was heated to 49° C. By doing so a pressure of 20 bar occurred inside the pressure cylinder. The system was pressure relieved, the cellulose being flung out through a ball valve of 40 mm diameter. The drop in pressure from 20 bar to 1 bar (atmospheric pressure) took 120 ms.

Example 3

In the case of cellulose samples activated according to the invention as well as of comparison samples X-ray spectrums were recorded with $Cu_\alpha$-radiation, which are shown in FIG. 1.

Sample A is a cellulose activated as in example 1. The residual ammonia content was less than 0.5% by mass.

Sample B was subjected to a heat treatment and no longer contained any detectable residual ammonia content. Sample C was treated with water at 80° C. for 60 minutes. Sample D is a comparison cellulose which was treated with aqueous ammonia solution (ratio of aqueous $NH_3$/cellulose 10:1) and then dried. Comparison sample E is untreated cellulose.

It is clearly noted that the X-ray spectrum of sample A treated according to the invention differs clearly from those of the comparison samples D and E. At 2θ values of 20.5, 17 and 11.25 new peaks occur which are not present in the spectrums of the comparison samples. At the same time the peaks at 2θ values of 22.5, which dominate the X-ray spectrums of the comparison samples, disappear. The X-ray spectrum of sample B shows that by a drying and heat treatment, respectively, whilst removing the residual ammonia content, no change in the structure occurs. In contrast thereto, the treatment with warm water (sample C) shows a return of the new cellulose modification produced by the ammonia explosion in the direction of the initial modification. The X-ray spectrum of the untreated cellulose material E corresponds substantially to the spectrum of the cellulose I.

From the X-ray spectrums the respective degree of crystallinity (Crystal Index, CrI) can be calculated according to the following formula: $CrI=1-h_{am}/h_{cr}$. As "crystalline height" $h_{cr}$ the height of the crystal stray peak with the strongest intensity (reflex at 2θ=22.5° in the case of cellulose I, and 2θ=20.5° in the case of the cellulose produced according to the invention, respectively) and as "height of the amorphous reflexion" $h_{am}$ the base line height on the left leading edge was used. To calculate the Crystal Index, reference is also made to Hans A. Krässig "Polymer Monographs", Vol. II, Gordon and Breach Science Publishers, p. 89. The following values were obtained: A (62%), B (60%), C (43%), D (45%) and E (44%). Surprisingly, the crystallinity does not decrease as a result of the ammonia explosion, but increases considerably (from 44% to 62%). Notwithstanding this increase in crystallinity, the reactivity of the ammonia-exploded cellulose is clearly higher. In contrast thereto, with the activation process in liquid ammonia according to the state of the art described at the outset an amorphisation of the cellulose takes place.

Example 4

Figure 1E:
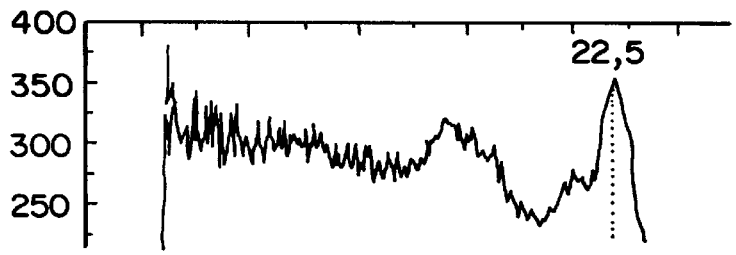
FIG. 1 shows the X-ray spectrum of Sample A according to the invention, Example 1, Sample B in which the material was subjected to heat and contained no residual ammonia content, Sample C in which the material was treated with water leading to a partial conversion back to the untreated sample. Sample D is a comparison with material treated with aqueous ammonia and Sample E is untreated cellulose.
Figure 1D:
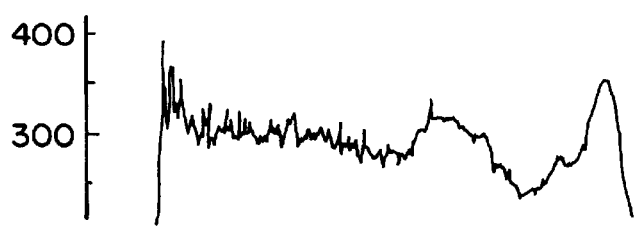
Figure 1C:
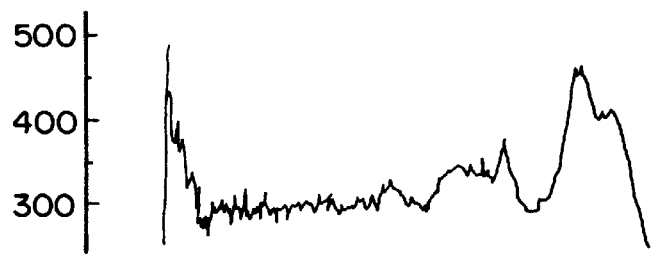
Figure 1B:
Figure 1A:
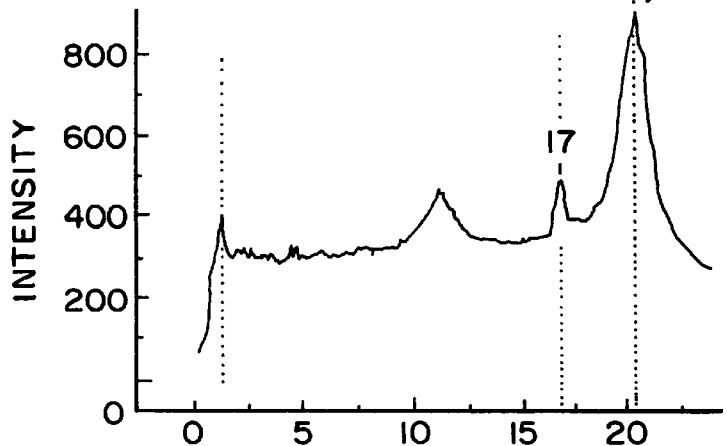
Figure 2:
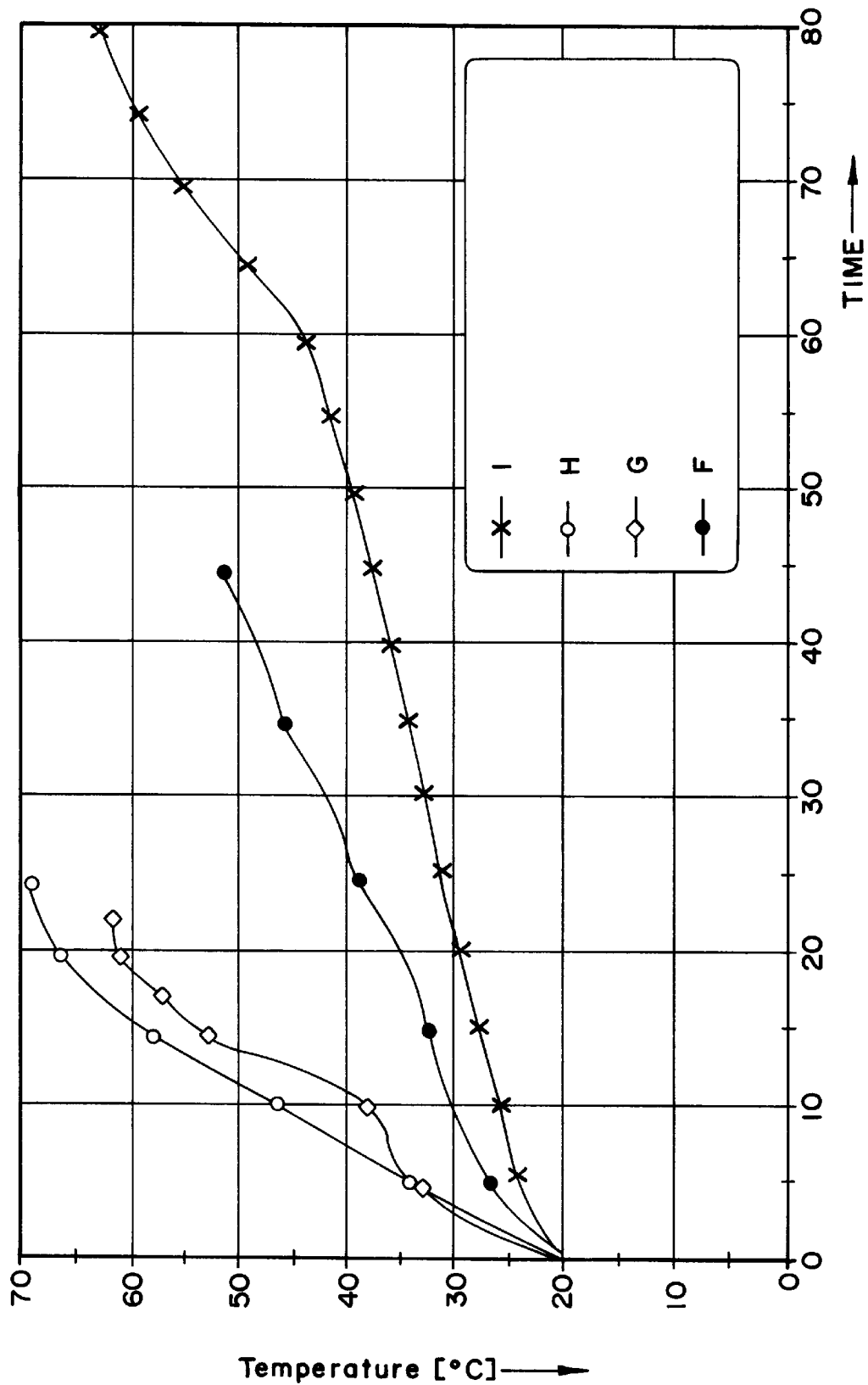
FIG. 2 is a temperature time graph and comparison in the acetylation reaction of the samples according to the invention which proceeded homogeneously and samples F, G and H which contained 30.7% water.

Chemical cellulose materials which has been adjusted to different water contents were subjected to an ammonia explosion as in example 1. The obtained cellulose materials were subjected to the acetylation test described in the foregoing. As reference commercial cellulose was used. The temperature/time graphs are shown in FIG. 2. The samples F, G and H correspond to initial water contents of 30.7 and 0.5% by mass, respectively. I is the reference.

All ammonia-exploded samples can be acetylated considerably more quickly than the untreated reference sample. The reaction graph of the reference sample clearly is split into two sections, which are separated by a kink in the temperature graph over the time. Between about 20° C. and 44° C. an initially flat temperature increase can be noted, whereas between 44° C. and the end temperature of 62° C. a greater increase takes place. This phenomenon can be attributed to the different reactivity of the OH-groups of the cellulose material. The OH-groups in the amorphous part of the cellulose material are more easily accessible for the acetylation reagent and react more quickly than those in the crystalline part. With the samples according to the invention the acetylation reaction takes place in a substantially uniform manner.

From FIG. 2 also the influence of the initial water content on the activity of the obtained product can be noted. The sample with the highest initial water content (30%) displays a lower activity. The other two samples (with the equilibrium moisture of the cellulose at ambient atmosphere of 7% and dried to 0.5%, respectively) react clearly faster, in which connection no noticeable difference can be detected between the samples G and H.

Example 5

In this example the behaviour of cellulose material activated according to the invention during the carboxymethylation and silylation with hexamethyl disilazane, respectively, is examined.

Carboxymethylation—Test I 4 g of cellulose activated according to the invention (see example 1, residual ammonia content about 0.2%), 80 ml isopropanol and 4.2 g 22% NaOH-solution were put into a three-necked flask, which was equipped with a stirring device and a heating device. This mixture was stirred for 90 minutes at ambient temperature, and then 2.3 g sodium monochloroacetate in 3.2 g water were added. The mixture was again stirred for 10 minutes at ambient temperature and then heated for 3½ hours to 55° C. The reaction product was sucked off via a frit, washed successively with 90° C. warm water, isopropanol and then with acetone. The reaction product was dried at ambient temperature. The obtained product in water, after a swelling phase, displayed a good dissolving behaviour and resulted in a clear 2% aqueous solution.

For comparison purposes untreated cellulose was subjected to the carboxymethylation process described above. The obtained product was swollen in water and dispersed. The solution was cloudy and showed many undissolved fibres.

Carboxymethylation—Test II

In another test ammonia-exploded and untreated cellulose were reacted with an only small quantity of carboxymethylation reagent, so that an only slight substitution degree could occur. From the dissolution residues of the respective carboxymethyl celluloses, conclusions can be drawn regarding the homogeneity of the reaction and accordingly of the product. In the following table some of the properties of the carboxymethylation products are summarised:

| Starting cellulose | DS | Dissolution residue (%) |
|---|---|---|
| Untreated cellulose | 0.35 | 67.4 |
| Activated cellulose | 0.44 | 32.7 |

It will be noted that, using the same reagent, the ammonia-exploded cellulose was not only converted to a greater extent (DS=0.44) than the untreated cellulose, but it also displayed a considerably lower dissolution residue. This can clearly be attributed to the better accessibility of the ammonia-exploded cellulose and, therefore, to its higher reactivity and reagent exhaustion.

Silylation 1 g of cellulose activated according to the invention (mass ratio ammonia to cellulose 10:1, reaction time 2 min at 14 bar) with a residual ammonia content of 2% by mass was mixed into 70 ml dimethyl formamide (DMF) with 25 ml hexamethyl disilazane and 100 mg p-toluene sulphonic acid as catalyst. The mixture was kept at 140° C. for 6 hours under nitrogen atmosphere. At the end of the reaction time the cellulose had been completely dissolved. The reaction product was precipitated with a mixture of isopropanol and water (30:70) and dried. It dissolved in dichloromethane with a small amount of gel. The evaluation of the infrared spectrum of the product showed a substitution degree DS of trimethyl silyl groups of more than 2.5. Accordingly, a very far-reaching silylation took place.

For comparison purposes untreated cellulose was subjected to the silylation process described above. In dichloromethane only a fibrous suspension was obtained.

Example 6

This example explains the activation of guar gum according to the invention.

50 g guar gum (powdered, water content about 7.9%, protein content about 4%) were put into an autoclave with a volume of 1 l and a double wall for steam heating. Next 280 g liquid ammonia were pressed into the autoclave through a valve. By steam heating the autoclave the temperature was raised to 60° C. By doing so a pressure of 30 bar occurred. The system was kept under these conditions for 30 minutes. Next the guar gum/liquid ammonia system was pressure relieved suddenly and completely into an explosion tank with a volume of 100 l. The water content after the explosion was 2.6%. The process product was collected and dried at 60° C. The residual ammonia content was 1% by mass.

Figure 3:
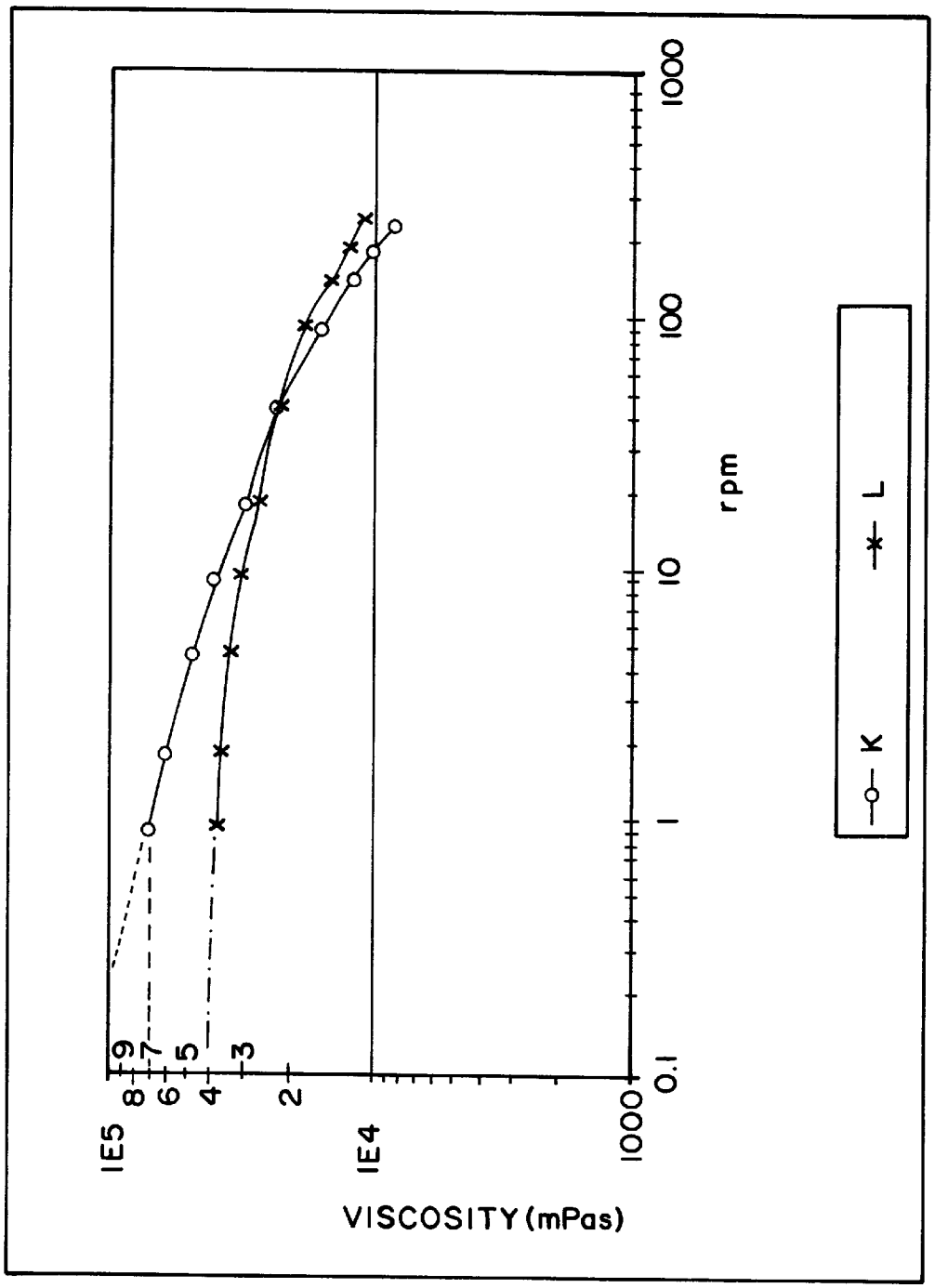
FIG. 3 shows the comparison in viscosity of the carboxymethylated product previously activated according to the invention, and a product not activated according to the invention.

The product obtained in this manner was carboxymethylated according to a customary process. FIG. 3 shows the viscosity curves (viscosity as function of the shear rate expressed as rpm) of a 1% solution in water of a carboxymethylated guar gum without pre-treatment (K) and of the carboxymethylated ammonia-exploded guar gum (L). The viscosity curve of the guar gum activated according to the invention prior to the carboxymethylation is clearly flatter than that of the comparison product. It has a much longer Newton range, i.e. the change in viscosity at low shear rates is less than with the comparison product. At a low shear rate the viscosity is clearly lower. The differences indicate that the sample pre-treated according to the invention gave a more homogeneous product. The interactions between the polymer chains are less when the substituents are more evenly distributed along the chains. Lower interactions result in low viscosities and a viscosity pattern under shear that comes closer to the Newton behaviour.

When pouring out an aqueous solution, the ammonia-exploded, carboxymethylated guar gum runs out easily. In contrast thereto, with the comparison sample the jet of liquid broke off frequently.

Example 7

This example shows the use of the carboxymethylated guar gum produced in example 5 as a thickening agent for printing textiles.

During the textile printing a dye paste thickened with carboxymethylated guar gum was applied onto the textile material; then the textile material was steamed and the thickening agent washed out again. It was found that the comparison sample without pre-treatment prior to the carboxymethylation is difficult to wash out. This resulted in a hard feel of the textile material. In contrast thereto, with the guar gum that had first been ammonia-exploded and then carboxymethylated, the washing out presented no problems and the subsequent feel of the material is pleasantly soft.

Example 8

This example explains the activation of chitin according to the invention.

40 g chitin (water content about 7%) were left to stand in a device described in example 1 at room temperature and 6–7 bar for 14 hours. Next the temperature was increased to 66° C., during which a pressure of 30 bar occurred, and left at this temperature for half an hour. Then the system was exploded into a collecting tank. The water content after the explosion was 1.7%.

After the ammonia explosion the originally very smooth and hard surface of the chitin particles had expanded in a popcorn-like manner and felt less smooth and hard. The IR-spectrum of the obtained product displays clear differences from the IR-spectrum of the untreated chitin. The intensity of the carbonyl oscillation bands in the acetyl group is clearly reduced. This clearly indicates that as a result of the effect of the ammonia a considerable amount of the chitin had been converted to chitosan. The increase in the IR-transmission at $\upsilon-1653$ cm$^{-1}$ clearly points to a de-acetylation degree of more than 40%.

What is claimed is:

1. A process of activating a polysaccharide, which comprises the steps of:
   a) contacting said polysaccharide with liquid ammonia at a pressure higher than atmospheric pressure and at a temperature of at least about 25° C., wherein the quantity of liquid ammonia suffices to at least wet the surface of said polysaccharide to obtain a mixture of liquid ammonia and said polysaccharide; and
   b) subjecting said mixture to a pressure release, the volume available for the polysaccharide and liquid ammonia system is increased in an explosion-like manner while reducing the pressure by at least 5 bars.

2. The process according to claim 1, wherein said explosion-like increase in volume takes place within a period of less than one second.

3. The process according to claim 1, wherein said polysaccharide and the liquid ammonia in step a) are brought in contact in a pressure device, and the pressure of the polysaccharide and liquid ammonia mixture is released in step b) by transferring the mixture into an explosion chamber having a volume larger than that of the pressure device.

4. The process according to claim 1, wherein the pressure in step a) is set to between about 5 and 46 bars.

5. The process according to claim 4, wherein the pressure in step a) is between about 25 and 30 bars.

6. The process according to claim 3, wherein the temperature in the pressure device in step a) is set to between 25 to 85° C.

7. The process according to claim 6, wherein the temperature is between about 55° and 65° C.

8. The process according to claim 1, wherein in step b) the pressure is reduced in an explosion-like manner by at least about 10 bars.

9. The process according to claim 1, wherein in step a) said mixture consists of 1 part by mass of said polysaccharide and at least 1 part by mass of liquid ammonia.

10. The process according to claim 9, wherein the amount of liquid ammonia is about 5–10 parts by mass.

11. The process according to claim 1, wherein the ammonia evaporated by the explosion-like increase in volume in step b) is condensed to liquid ammonia and fed back into the process.

12. The process according to claim 1, wherein step b) is carried out in an explosion chamber and prior to feeding into said chamber the polysaccharide and liquid ammonia mixture, said explosion chamber is kept under vacuum.

13. The process according to claim 1, wherein said polysaccharide has a polyhexose structure.

14. The process according to claim 1, wherein said polysaccharide has a polymerization degree DP not less than 150.

15. The process according to claim 14, wherein said polysaccharide is cellulose.

16. The process according to claim 15, wherein said cellulose is a compact chemical cellulose material with a density of about 0.6 to 0.8 g/cm$^3$.

17. The process according to claim 1, wherein said polysaccharide is a member selected from the group consisting of cellulose, starch, chitin and a galactomannan.

18. The process according to claim 17, wherein said galactomannan is guar gum.

19. The process according to claim 1, wherein said polysaccharide in step a) has a water content of less than about 12% by mass.

20. The process according to claim 1, wherein said polysaccharide in step a) contains less than 18% by mass of foreign substances.

21. The process according to claim 1, wherein said polysaccharide in step a) is free of proteins.

22. The process according to claim 1, wherein after step b) in order to remove adhering ammonia, the product is subjected to vacuum or is heated or both subjected to vacuum and heated.

23. An exploded crystalline cellulose which exhibits an X-ray diffraction spectrum with peaks at the following diffraction angles 2θ and with the relative intensities:

Peak 11.25±1 with the relative intensity of about 15 to 25;

Peak 17±1 with the relative intensity of about 25 to 40;

Peak 20.5±1 with the relative intensity of 100 (reference value).

24. The cellulose according to claim 23, which exhibits a LODP-value of about 50 to 200.

25. The cellulose according to claim 24, wherein said LODP value is about 100–160.

26. The cellulose according to claim 24, which is in the form of a fluff with a density of less than about 0.2 g/cm$^3$.

27. The cellulose according to claim 26, wherein the density is less than about 0.1 g/cm$^3$.

28. The cellulose according to claim 27, wherein said fluff has an ammonia content of less than about 0.5% by mass.

29. The method of producing cellulose derivatives by reaction with an acylation, alkylation, silylation, xanthogenation or a carbamoylation reagent which consists of reacting said cellulose according to claim 23 with said reagent.

30. The method of preparing a solution of cellulose for wet spinning which consists of forming a solution from the crystalline cellulose according to claim 23.

* * * * *